United States Patent
Harada

(10) Patent No.: US 8,637,809 B2
(45) Date of Patent: Jan. 28, 2014

(54) TANDEM QUADRUPOLE MASS SPECTROMETER

(71) Applicant: Shimadzu Corporation, Kyoto (JP)

(72) Inventor: Shigetoshi Harada, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 13/689,123

(22) Filed: Nov. 29, 2012

(65) Prior Publication Data

US 2013/0181127 A1    Jul. 18, 2013

(30) Foreign Application Priority Data

Jan. 13, 2012 (JP) ................................. 2012-004689

(51) Int. Cl.
H01J 49/26 (2006.01)

(52) U.S. Cl.
USPC ............ 250/281; 250/282; 250/283; 250/286

(58) Field of Classification Search
USPC .................................. 250/281, 282, 283, 286
See application file for complete search history.

(56) References Cited

U.S. PATENT DOCUMENTS

| | | | | |
|---|---|---|---|---|
| 5,981,946 | A * | 11/1999 | Mason | 250/287 |
| 7,928,365 | B2 * | 4/2011 | Oonishi et al. | 250/287 |
| 2010/0001180 | A1 * | 1/2010 | Bateman et al. | 250/282 |
| 2013/0048852 | A1 * | 2/2013 | Verenchikov | 250/282 |

FOREIGN PATENT DOCUMENTS

JP    2006-278024 A    10/2006

* cited by examiner

*Primary Examiner* — Michael Logie
(74) *Attorney, Agent, or Firm* — Sughrue Mion, PLLC

(57) ABSTRACT

All data obtained from an A/D converter during a summation period with values exceeding a prescribed threshold is excluded from summation up to a prescribed maximum number of deletions, and the values of the remaining data are summed to find one piece of measurement data corresponding to that summation period. The number of pieces of noise data reflecting the influx of particles that cause spike-like noise is extremely small, so noise data is removed in a state in which there are no signals and no target ions are present. When target ions are present, legitimate data which is not noise data may be removed, but the number of pieces of removed data is small in comparison to the total number of pieces of data, so the effects of the removal of legitimate data essentially do not emerge in the summation results. It is therefore possible to effectively reduce spike-like noise.

1 Claim, 3 Drawing Sheets

(a) NO SIGNALS (NO SPIKE-LIKE NOISE)

(b) NO SIGNALS (SPIKE-LIKE NOISE PRESENT)

(c) ION INCIDENCE

US 8,637,809 B2

TANDEM QUADRUPOLE MASS SPECTROMETER

TECHNICAL FIELD

The present invention relates to a tandem quadrupole mass spectrometer capable of performing MS/MS analysis. More particularly, the present invention relates to noise-reducing technology in a tandem quadrupole mass spectrometer.

BACKGROUND ART

A technique called MS/MS analysis (tandem analysis) is widely used as one method of mass spectrometry to identify substances with large molecular weights and to analyze the structures thereof. There are various configurations of mass spectrometers for performing MS/MS analysis, but one which has a comparatively simple structure and can be easily operated and handled is a tandem quadrupole (also called a triple quadrupole) mass spectrometer.

As described in Patent Literature 1 or the like, in a typical tandem quadrupole mass spectrometer, ions derived from a sample constituent produced by an ion source are introduced into a preliminary quadrupole mass filter (commonly described as Q1), and ions having a specific mass-to-charge ratio m/z are selected as precursor ions. These precursor ions are introduced into a collision cell internally equipped with a quadrupole (or greater number of poles) ion guide (commonly described as q2). A collision-induced dissociation (CID) gas such as argon is fed into the collision cell, and the precursor ions collide with the CID gas inside the collision cell and are split so that various product ions are produced. These product ions are introduced into a subsequent quadrupole mass filter (commonly described as Q3), whereby product ions having a specific mass-to-charge ratio m/z are selected and detected as they reach a detector.

Devices using a multistage dynode-type secondary electron multiplier or devices combining a conversion dynode, a fluorescent substance, and a photoelectron multiplier are used as detectors. In typical tandem quadrupole mass spectrometers of recent years, an analog detection signal obtained by such a detector is first sampled with a prescribed sampling period and then subjected to analog/digital (A/D) conversion, and the resulting digital data is summed (or averaged) over a prescribed duration of time (typically called the Dwell Time) so as to obtain measurement data for a given single point. For example, when performing MRM (Multiple Reaction Monitoring) measurements in GC/MS/MS or LC/MS/MS using a tandem quadrupole mass spectrometer as a detector of a gas chromatograph (GC) or a liquid chromatograph (LC), a mass chromatogram of the target mass-to-charge ratio is created using measurement data obtained by summation for each dwell time.

When performing MS/MS analysis with a tandem quadrupole mass spectrometer, product ions produced from ions selected by the preliminary quadrupole mass filter are detected after being selected by the subsequent quadrupole mass filter, so the arrival of undesired ions such as ions derived from impurities at the detector can be dramatically suppressed. Therefore, chemical noise, which is problematic in an ordinary mass spectrometer comprising only a single quadrupole mass filter, can be almost completely eliminated. However, since it is not possible to completely remove noise caused by the influx of neutral particles into the detector, spike-like noise is observed when the sensitivity (gain) of the detector is increased.

FIG. 4 (a) is an example of a mass chromatogram observed when MRM measurements are performed for 10 minutes with precursor ions of m/z=272 and product ions of m/z=241 in a state without a sample—that is, a state without a signal. As can be seen in the drawing, it can be confirmed that spike-like noise is generated almost randomly. Such noise becomes more prominent as the sensitivity of the detector is increased due to the nature of microanalysis, so the noise becomes a substantial impediment to the assay of trace constituents.

PATENT LITERATURE 1) Japanese Unexamined Patent Application Publication 2006-278024

SUMMARY OF THE INVENTION

The present invention was conceived in light of the problems described above, and its purpose is to provide a tandem quadrupole mass spectrometer capable of reducing spike-like noise which is particularly problematic in MS/MS analysis.

According to the research of the inventor of this application, it was ascertained that the spike-like noise described above does not depend on the measured mass-to-charge ratio, and although there is a certain amount of fluctuation due to the conditions of the device, such noise occurs randomly at a frequency of approximately several pulses per second. On the other hand, although the summation time for summing data—that is, the dwell time—depends on the measurement mode or the measurement conditions (for example, the scan speed in the case of a scan measurement mode), the time is within the range of several msec to approximately 100 msec, and the sampling period of the A/D conversion part is substantially shorter than the dwell time. That is, while the total number of pieces of data summed during one dwell time period is extremely high, the number of any pieces of noise data (data in which intensity due to the aforementioned influx of neutral particles is reflected) that may be present in the data is considered to be very low.

Accordingly, although it is impossible to differentiate between noise data and legitimate data, even if part of the data is considered noise data and deleted—that is, excluded from summation—this should have practically no effect on the summation results while the ions to be measured are arriving at the detector. On the other hand, while the ions to be measured are not arriving at the detector, the likelihood that a small amount of data exceeding a certain value may be noise data can be considered high. The present invention was conceived based on such knowledge and ideas.

That is, the present invention conceived in order to solve the problems described above is a tandem quadrupole mass spectrometer equipped with an ion source, a preliminary mass filter for selecting and transmitting ions having a specific mass-to-charge ratio from various ions produced by the ion source as precursor ions, a collision cell for splitting the precursor ions to produce product ions, a subsequent mass filter for selecting and transmitting ions having a prescribed mass-to-charge ratio among the produced product ions, and a detector for detecting the ions passing through the subsequent mass filter, wherein the tandem quadrupole mass spectrometer is provided with:

a) an A/D conversion means for converting a signal obtained by the detector into digital data with a prescribed period;

b) a data value assessment means for assessing whether the value of digital data obtained by the A/D conversion means exceeds a prescribed threshold; and c) a data summation means for finding measurement data of each summation period for all data obtained by the A/D conversion means during the summation period by excluding from summation the maximum predetermined number of pieces of data with values assessed to exceed the prescribed threshold by the data value assessment means and summing or averaging the values of the data that has not been excluded.

Here, the aforementioned "prescribed threshold" is determined to be a higher value than the level of noise signals (primarily noise derived from the circuit system such as thermal noise) inputted into the data value assessment means when no ions or neutral particles or the like which may cause the spike-like noise described above are introduced into the detector—that is, in a state when there are absolutely no signals. The "maximum predetermined number of pieces of data" described above is determined to a sufficiently small value with respect to the total number of pieces of digital data obtained during the summation period.

When neutral particles or the like which cause spike-like noise fly into the detector in a state in which no ions to be measured have been introduced into the detector, the value of the data inputted into the data value assessment means from the A/D conversion means accordingly exceeds the prescribed threshold. As a result, the data summation means excludes data indicating a value generated by the influx of neutral particles or the like from the target of summation. As described above, even if there is an influx of neutral particles or the like during the summation period (dwell time), the number of such occurrences is very small and does not ordinarily reach the "maximum predetermined number" described above. Therefore, practically all data indicating a value generated by the influx of neutral particles is excluded from summation during the summation period and is not reflected in the summation results. That is, spike-like noise is removed.

On the other hand, in a state in which ions to be measured have been introduced into the detector, the value of practically all data inputted into the data value assessment means from the A/D conversion means exceeds the prescribed threshold. Therefore, although the data summation means excludes the data from summation in the early stage of a single summation period, the number of pieces of excluded data quickly reaches the "maximum predetermined number" described above, so all subsequent data with values exceeding the prescribed threshold are subjected to summation. Since the number of pieces of data excluded from summation is extremely small in comparison to the total number of pieces of data obtained during a single summation period, the effects of excluding data emerge minimally in the summation results.

With the tandem quadrupole mass spectrometer of the present invention, it is possible to reduce spike-like noise which is problematic in MS/MS analysis. As a result, it is possible to create a mass chromatogram with a low level of background noise, for example, and to achieve high assay performance by accurately capturing peaks corresponding to ions to be measured.

In addition, the noise-reducing technology of the tandem quadrupole mass spectrometer of the present invention is particularly useful when the summation period is comparatively long. Therefore, the present invention exhibits particular effectiveness in a measurement mode in which the mass-to-charge ratio of precursor ions and product ions is fixed (not scanned), as in the case of MRM measurements. The present invention is also able to demonstrate sufficient effectiveness when the scan speed is comparatively slow, even in a measurement mode involving scans such as product ion scans or precursor ion scans.

DESCRIPTION OF THE EXEMPLARY EMBODIMENTS

Figure 1:
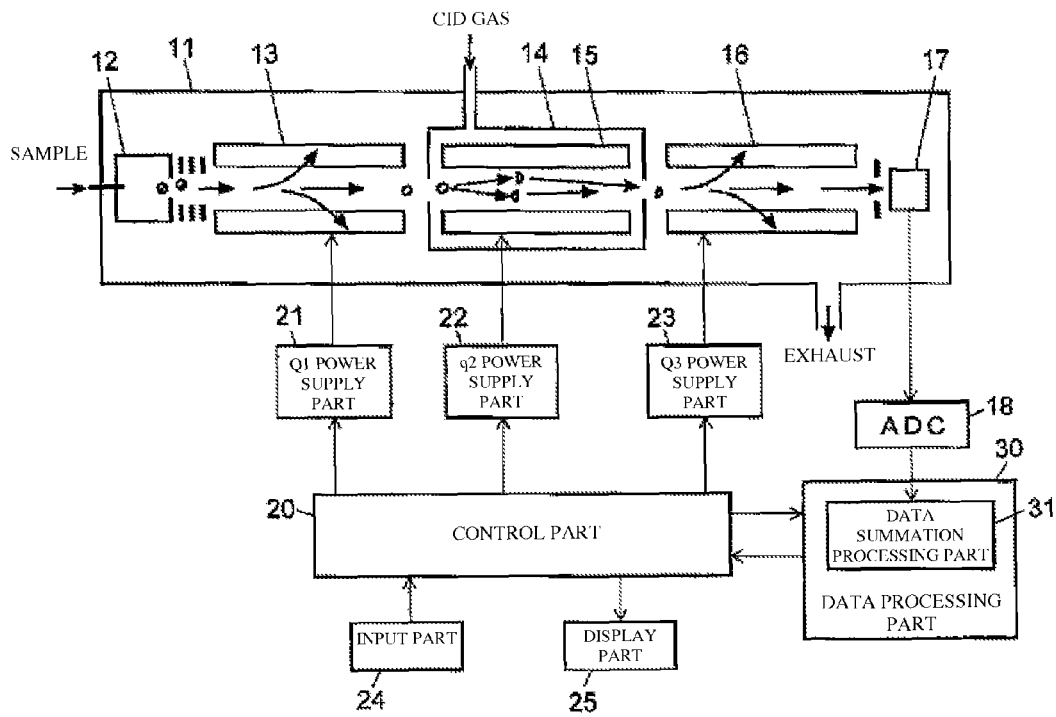
FIG. 1 is a schematic diagram of the relevant parts of a tandem quadrupole mass spectrometer according to an embodiment of the present invention.

The tandem quadrupole mass spectrometer of an embodiment of the present invention will be described hereinafter with reference to the attached drawings. FIG. 1 is a schematic diagram of the relevant parts of the tandem quadrupole mass spectrometer of this embodiment.

The tandem quadrupole mass spectrometer of this embodiment is equipped with an ion source 12 for ionizing a sample to be measured, a preliminary quadrupole mass filter 13 and a subsequent quadrupole mass filter 16 respectively comprising four rod electrodes, a collision cell 14 internally provided with a multipole ion guide 15, and a detector 17 for detecting ions and outputting a detection signal corresponding to the amount of ions inside an analysis chamber 11 which is vacuum-evacuated by a vacuum pump not shown in the drawing. When the sample is a liquid, an atmospheric pressure ion source such as ESI, APCI, or APPI is used as the ion source 12, and when the source is a gas, EI, CI or the like is used as the ion source 12.

A prescribed voltage is respectively applied to the preliminary quadrupole mass filter 13 from a Q1 power supply part 21, to the multipole ion guide 15 from a q2 power supply part 22, and to the subsequent quadrupole mass filter 16 from a Q3 power supply part 23 under control by a control part 20. An input part 24 with which user makes input settings or the like and a display part 25 for displaying measurement results and the like are connected to the control part 20.

The detector 17 is a detector using a multistage dynode-type secondary electron multiplier, for example. After an analog detection signal (ion intensity signal) outputted from this detector 17 is sampled with a prescribed sampling period by an A/D converter (ADC) 18, the signal is converted into digital data and inputted into a data processing part 30. The data processing part 30 includes a data summation processing part 31 for performing characteristic operations described below. The data summation processing part 31 sums (averages) the data values for each dwell time, and a mass chromatogram or a mass spectrum is created by the data processing part 30 based on the measurement data obtained by this summation.

The control part 20 and the data processing part 30 are functional blocks which are realized as hardware in a personal computer by executing specialized control/processing software installed on the computer.

Both the voltage applied to the preliminary quadrupole mass filter 13 from the Q1 power supply part 21 and the voltage applied to the subsequent quadrupole mass filter 16 from the Q3 power supply part 23 under control by the control part 20 are voltages in which a high-frequency voltage is multiplexed with a direct current voltage. The direct current voltage and the high-frequency voltage are respectively determined as voltages corresponding to the mass-to-charge ratio of the ions to be selected. On the other hand, the voltage applied to the multipole ion guide 15 from the q2 power supply part 22 is a high-frequency voltage for ion convergence.

When executing MRM measurements with the tandem quadrupole mass spectrometer of this embodiment, the user respectively inputs and sets the mass-to-charge ratio of precursor ions and product ions from the input part 24. As a result, the Q1 power supply part 21 applies a voltage to the preliminary quadrupole mass filter 13 under the control of the control part 20 so that only precursor ions of the preset mass-to-charge ratio are transmitted selectively, and the Q3 power supply part 23 applies a voltage to the subsequent quadrupole mass filter 16 so that only product ions of the preset mass-to-charge ratio are transmitted selectively. Various ions originating from the sample produced by the ion source 12 are introduced into the preliminary quadrupole mass filter 13, but only the preset precursor ions pass through the preliminary quadrupole mass filter 13 and enter the collision cell 14.

The precursor ions make contact with a CID gas inside the collision cell 14 so that splitting is promoted and various product ions are produced. These various product ions emerge from the collision cell 14 and are introduced into the subsequent quadrupole mass filter 16, but only the preset product ions pass through the subsequent quadrupole mass filter 16 and reach the detector 17. Therefore, ideally, the product ions reach the detector 17 and a detection signal corresponding to the ion quantity is generated only when preset product ions produced from the preset precursor ions are present. However, a detection signal is similarly generated when unintended neutral particles or the like fly into the detector 17, and it is impossible to distinguish whether the detection signal is due to the target ions or due to undesired neutral particles or the like.

Therefore, with the tandem quadrupole mass spectrometer of this embodiment, noise originating from an influx of such neutral particles is removed by executing characteristic data summation processing such as that described below.

Figure 2:
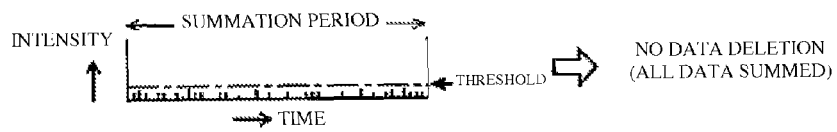
FIG. 2 is a conceptual diagram of the processing for noise reduction in the tandem quadrupole mass spectrometer of this embodiment.
Figure 2:
Figure 2:
Figure 3:
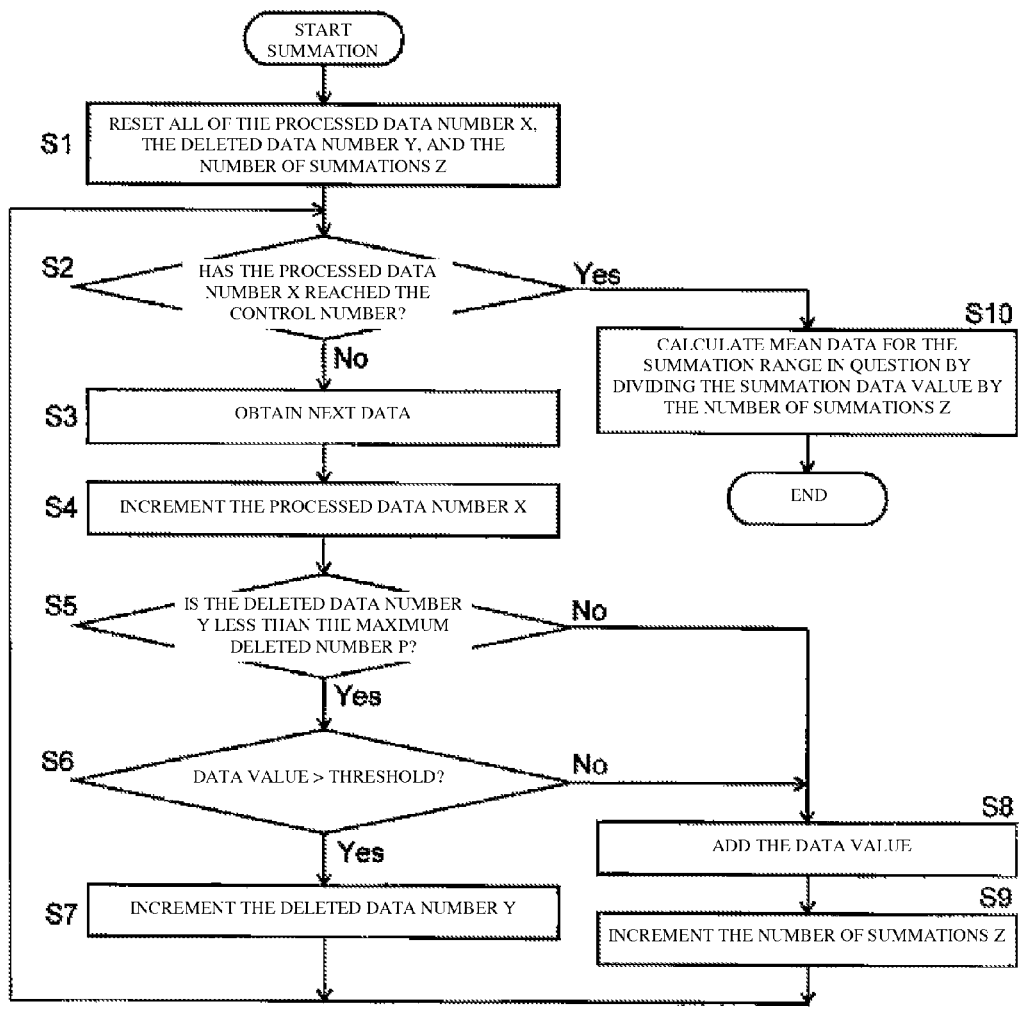
FIG. 3 is a flowchart showing the operation of the data summation processing part of the tandem quadrupole mass spectrometer of this embodiment.

FIG. 2 is a conceptual diagram of the processing for noise reduction in the tandem quadrupole mass spectrometer of this embodiment, and FIG. 3 is a flowchart showing the operation of the data summation processing part 31 in FIG. 1 during a single summation period (dwell time). In the following explanation, the sampling period of the A/D converter 18 is 5 μsec, and the dwell time is 100 msec, for example. Therefore, the total number of pieces of data to be processed during a single summation period (data outputted from the A/D converter 18 and inputted into the data processing part 30) is 100,000÷5=20,000. The control number in step S2 is this total number of pieces of data—that is, 20,000.

When the summation processing is begun in one summation period, three variables used in the processing—that is, the processed data number X, the deleted data number Y, and the number of summations Z—are all reset (step S1). Next, it is assessed whether all of the processing for data to be processed during the summation period is complete by assessing whether the processed data number X has reached the control value described above (step S2).

If the processed data number X is less than the prescribed number in step S2—that is, if there still remains data to be processed during the summation period—data for the next sampling timing is obtained (step S3), and the processed data number X is incremented (step S4). It is then assessed whether the deleted data number Y at that point in time is less than the maximum deleted number P (step S5), and if the deleted data number Y is less than the maximum deleted number P, it is assessed whether the value of the data obtained in step S3 exceeds a prescribed threshold (step S6).

The maximum deleted number P in step S5 is a value determined in advance in accordance with the length of the sampling period or the summation period—that is, the total number of pieces of data to be processed (control number described above)—and is set appropriately to a value of approximately 0.1% of the total number of pieces of data to be processed as a rough standard, which is within the range of approximately 10 to 100 in this example. On the other hand, the threshold in step S6 is set to a level so that an assessment of "Yes" is not given in step S6 when there are absolutely no signals (state in which no ions or neutral particles are introduced into the detector 17)—that is, it is a value selected appropriately so as to be reliably larger than a data value corresponding to noise in a circuit system including thermal noise of the detector 17 or a circuit such as an amplifier not shown in the drawing and smaller than a data value when ions or neutral particles enter the detector 17. The threshold or the maximum deleted number P should be determined in advance by the device manufacturer.

If it is assessed in step S6 that the data value does not exceed the threshold (case in which the assessment is "No"), it can be assessed that there are no signals due to the reasons described above, so the data value at that time is added (step S8), the number of summations Z is incremented (step S9), and the process returns to step S2). On the other hand, if it is assessed in step S6 that the data value exceeds the threshold (case in which the assessment is "Yes"), it can be assessed that ions or neutral particles have entered the detector 17 in a state in which the deleted data number Y has not reached the maximum deleted number P, so the deleted data number Y is incremented (step S7) without adding the data value at that time (that is, the value is excluded from summation), and the process returns to step S2.

The processing of steps S2 to S9 described above is repeated until an assessment of "Yes" is given in step S2, so the processing is repeated 20,000 times in this example. During this repetition, the deleted data number Y is incremented each time the deleted data number Y is less than the maximum deleted number P ("Yes" in step 5) and the data value exceeds the prescribed threshold ("Yes" in step S6).

When all of the processing for the data to be processed during the summation period is complete, the process transitions from step S2 to S10, where the mean data value of the summation period is calculated by dividing the summation data value at that point in time by the number of summations Z. This mean data value is stored in a memory or the like as one piece of measurement data for the summation period in question and is used in the creation of a mass chromatogram or a mass spectrum.

When the state with absolutely no signals continues during one summation period, an assessment of "No" is continually made in step S6. This is a state in which not only are there no ions to be measured which reach the detector 17 during the summation period, but there is also no influx of neutral particles or the like which may cause spike-like noise into the detector 17. Therefore, in this case, there is no data to be excluded from summation, and the values of all of the data obtained during the summation period are summed (see FIG. 2 (a)).

If ions to be measured do not reach the detector 17 but there is an influx of neutral particles or the like which cause spike-like noise into the detector 17 during a single summation period, the value of the data outputted from the A/D converter 18 exceeds the threshold in accordance with this influx. However, the number of times in which such an influx of undesired particles occurs during a single summation period is small and does not normally reach the maximum deleted number P. Therefore, an assessment of "No" is practically never made in step S5 in the process of the repeated processing of steps S2 to S9 described above, and all data with values exceeding the threshold (data labeled with the ○ symbol in FIG. 2 (b)) is excluded from summation (see FIG. 2 (b)). That is, even if data exceeding the threshold sporadically appears due to the influx of neutral particles or the like into the detector 17, this is not summed, so it is not reflected in the summation value or the mean data value found from the summation value, and the noise is thereby reduced.

In a situation in which ions to be measured pass through the subsequent quadrupole mass filter 16 and reach the detector 17, the values of the data outputted from the A/D converter 18 practically continuously (or with a high frequency) exceed the threshold. Of course, this cannot be distinguished from any data that may result from the influx of neutral particles or the like which cause spike-like noise into the detector 17. In this way, when data values exceed the threshold with high frequency, the deleted data number Y exceeds the maximum deleted number P at a given point in the early stage of the summation period in the process of the repeated processing of steps S2 to S9 described above. Therefore, an assessment of "No" is given in step S5 from that point onward so that all data values exceeding the threshold are summed (see FIG. 2 (c)).

In this case, there is a high likelihood that the values of data excluded from summation (data labeled with the ○ symbol in FIG. 2 (c)) do not actually result from the incidence of neutral particles or the like but rather reflect the incidence of ions to be measured, but the number of pieces of data excluded from summation is at most the maximum deleted number P, and this is sufficiently smaller than the total number of pieces of data. Therefore, even if legitimate data were to be excluded from summation, the there is practically no effect on the summation results, and a highly precise value corresponding to the intensity of the ions to be measured can be obtained.

By performing the data summation processing described above, the tandem quadrupole mass spectrometer of this embodiment is able to effectively remove spike-like noise, which was previously problematic in MS/MS analysis.

Figure 4:
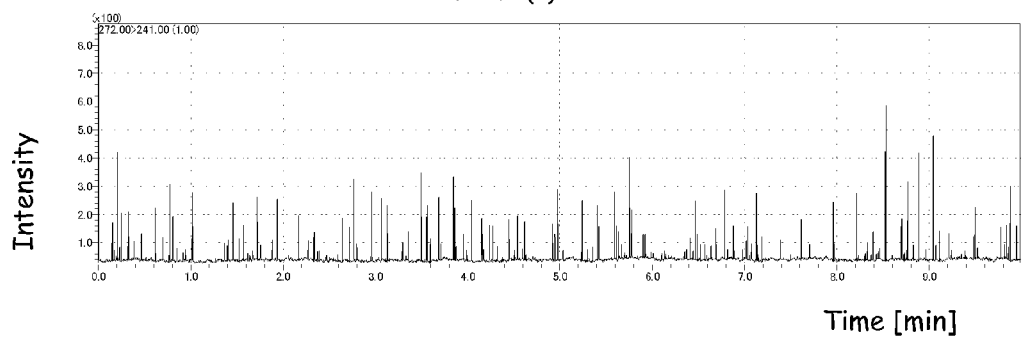
FIGS. 4A and 4B are an embodiment of noise data demonstrating the effects of the noise reduction processing of the present invention.
Figure 4:
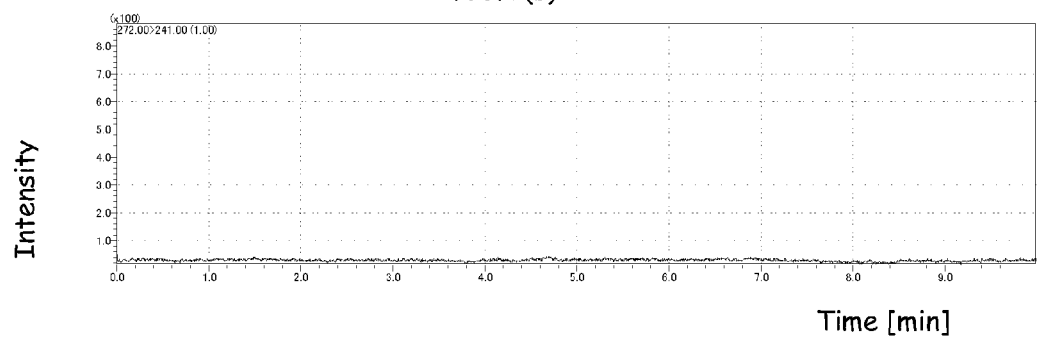

FIG. 4 (b) is noise data when the noise reduction processing accompanying the data summation processing described above is performed for the noise data shown in FIG. 4 (a). It can be seen that spike-like data which was prominent in FIG. 4 (a) has been sufficiently removed.

Figure 5:
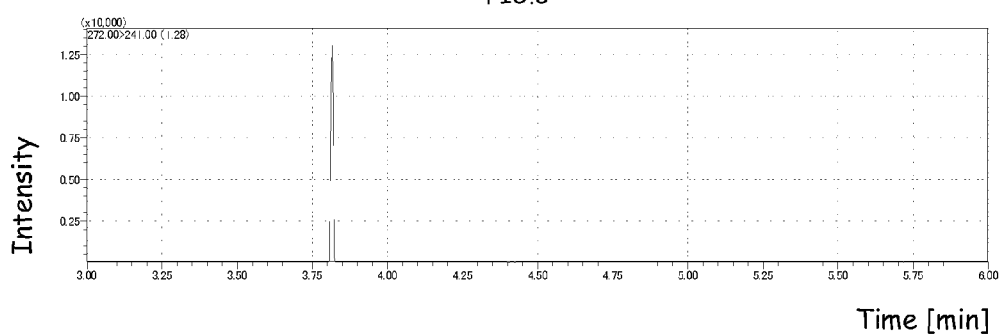
FIG. 5 is an example of actual measurements of a mass chromatogram obtained by performing MRM measurements on an actual sample.

FIG. 5 is an example of actual measurements of a mass chromatogram obtained by performing MRM measurements (precursor ions: m/z=272, product ions: m/z=241) on a sample containing 100 fg of octafluoronaphthalene (OFN) in GC/MS/MS using the tandem quadrupole mass spectrometer of this embodiment as a detector. It can be seen that background noise is sufficiently suppressed and that peaks derived from OFN are clearly observed. High-precision assay of OFN can be performed based on such peaks.

The embodiment described above is simply an example of the present invention, and it goes without saying that appropriate modifications, adjustments, and additions made within the scope of the gist of the present invention are also included in the scope of the patent claims of this application.

Explanation of References
11 . . . analysis chamber
12 . . . ion source
13 . . . preliminary quadrupole mass filter
14 . . . collision cell
15 . . . multipole ion guide
16 . . . subsequent quadrupole mass filter
17 . . . detector
20 . . . control part
21 . . . Q1 power supply part
22 . . . q2 power supply part
23 . . . Q3 power supply part
24 . . . input part
25 . . . display part
30 . . . data processing part
31 . . . data summation processing part

What is claimed is:

1. A tandem quadrupole mass spectrometer equipped with an ion source, a preliminary mass filter for selecting and transmitting ions having a specific mass-to-charge ratio from various ions produced by said ion source as precursor ions, a collision cell for splitting said precursor ions to produce product ions, a subsequent mass filter for selecting and transmitting ions having a prescribed mass-to-charge ratio among the produced product ions, and a detector for detecting the ions passing through said subsequent mass filter, wherein said tandem quadrupole mass spectrometer is provided with:
   a) an A/D conversion means for converting a signal obtained by said detector into digital data with a prescribed period;
   b) a data value assessment means for assessing whether the value of digital data obtained by said A/D conversion means exceeds a prescribed threshold; and
   c) a data summation means for finding measurement data of each summation period for all data obtained by said A/D conversion means during the summation period by excluding from summation the maximum predetermined number of pieces of data with values assessed to exceed the prescribed threshold by said data value assessment means and summing or averaging the values of the data that has not been excluded.

* * * * *